United States Patent
Arimoto et al.

(10) Patent No.: US 7,422,824 B2
(45) Date of Patent: Sep. 9, 2008

(54) ACTIVE MATERIAL OF POSITIVE ELECTRODE FOR NONAQUEOUS ELECTROLYTE SECONDARY BATTERY AND PROCESS FOR PRODUCING THE SAME

(75) Inventors: Shinji Arimoto, Osaka (JP); Takahiro Okuyama, Naga-gun (JP); Masatoshi Nagayama, Hirakata (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/513,925

(22) PCT Filed: Apr. 30, 2003

(86) PCT No.: PCT/JP03/05555

§ 371 (c)(1),
(2), (4) Date: Nov. 10, 2004

(87) PCT Pub. No.: WO03/098722

PCT Pub. Date: Nov. 27, 2003

(65) Prior Publication Data

US 2005/0221183 A1     Oct. 6, 2005

(30) Foreign Application Priority Data

May 16, 2002    (JP)    ............................ 2002-142145

(51) Int. Cl.
*H01M 4/58*    (2006.01)
(52) U.S. Cl. .............................. 429/231.95; 429/231.6; 429/231.3; 429/220
(58) Field of Classification Search ............... 429/323, 429/220, 231.95
See application file for complete search history.

(56) References Cited

U.S. PATENT DOCUMENTS

| | | | | |
|---|---|---|---|---|
| 5,286,582 | A * | 2/1994 | Tahara et al. ................ | 429/220 |
| 6,372,385 | B1 * | 4/2002 | Kweon et al. .......... | 429/231.95 |
| 6,551,743 | B1 * | 4/2003 | Nakanishi et al. ........... | 429/223 |
| 6,811,923 | B1 * | 11/2004 | Sakai et al. ................. | 429/209 |
| 6,998,071 | B2 * | 2/2006 | Maeda et al. ............ | 252/521.2 |
| 2001/0046628 | A1 * | 11/2001 | Oesten et al. ............ | 429/231.1 |
| 2002/0037456 | A1 | 3/2002 | Hosoya | |
| 2002/0086210 | A1 * | 7/2002 | Naruoka et al. ............. | 429/223 |
| 2004/0142240 | A1 * | 7/2004 | Nagayama et al. ........ | 429/231.1 |

FOREIGN PATENT DOCUMENTS

| | | |
|---|---|---|
| JP | 63-121258 | 5/1988 |
| JP | 11-73958 A | 3/1999 |
| JP | 2001-243948 A | 9/2001 |
| JP | 2001-319652 | 11/2001 |
| JP | 2002-198051 A | 7/2002 |
| JP | 2002-319398 A | 10/2002 |
| JP | 2003-86181 A | 3/2003 |

\* cited by examiner

*Primary Examiner*—Patrick Ryan
*Assistant Examiner*—Ben Lewis
(74) *Attorney, Agent, or Firm*—McDermott Will & Emery LLP (57) ABSTRACT

A positive electrode active material for a non-aqueous electrolyte secondary battery includes a particle of a composite oxide which contains Li and Co, wherein: the composite oxide further contains an element $M^1$ and an element $M^2$; the element $M^1$ is at least one selected from the group consisting of Mg, Cu and Zn; the element $M^2$ is at least one selected from the group consisting of Al, Ca, Ba, Sr, Y and Zr; the element $M^1$ is uniformly distributed in the particle; and the element $M^2$ is distributed in the surface portion of the particle more than in the inside thereof.

9 Claims, 5 Drawing Sheets

ACTIVE MATERIAL OF POSITIVE ELECTRODE FOR NONAQUEOUS ELECTROLYTE SECONDARY BATTERY AND PROCESS FOR PRODUCING THE SAME

TECHNICAL FIELD

The present invention relates to a positive electrode active material for a non-aqueous electrolyte secondary battery and a method for producing the same.

BACKGROUND ART

In recent years, a rapidly increasing number of household electronic devices have become cordless and portable, and as power sources for operating these devices, a growing number of small-sized lightweight non-aqueous electrolyte secondary batteries with a high energy density are in demand. From this perspective, expectations have been placed on non-aqueous electrolyte secondary batteries, especially lithium secondary batteries with a high voltage and high energy density, and the developments thereof have been accelerated.

A battery comprising a lithium-containing composite oxide as a positive electrode active material and a carbon material as a negative electrode active material has recently been attracting attention as a lithium secondary battery with a high energy density. As the lithium-containing composite oxide, $LiCoO_2$ has come into practical use. Although vigorous attempts have been made to put $LiNiO_2$ into practical use with the aim of achieving a higher capacity, $LiNiO_2$ has a problem of having low thermal stability, whereby there would be considerable difficulty in realizing the practical use thereof.

These positive electrode active materials repeat expansion and shrinkage by charging and discharging. At that time, distortion of a crystalline lattice, destruction of a crystal structure or cracking of a particle may occur in the positive electrode active material, resulting in a decrease in discharge capacity.

In order to avoid this, therefore, efforts have been made to attempt to stabilize a crystalline lattice by replacement of part of cobalt with another element so that a cycle life characteristic can be improved.

For example, Japanese Laid-Open Patent Publication No. Sho 63-121258 and Japanese Laid-Open Patent Publication No. 2001-319652 propose a positive electrode active material with part of cobalt replaced with an additional element, which is obtained by mixing a lithium compound, cobalt oxide and a compound of the additional element and then baking the mixture. Such proposals allow a certain degree of improvement in cycle life characteristic. As the additional element employed is an element having the effect of improving the cycle life characteristic, such as Al, and an element having the effect of improving thermal stability of a positive electrode active material, such as Mg.

In the above conventional method, however, the additional element tends to be distributed more in a surface portion of the positive electrode active material since a reaction occurs between solid phases. When the element having the effect of improving thermal stability is distributed more in the surface portion, the effect of improving thermal stability decreases, and thereby desired battery characteristics cannot be obtained. Accordingly considered has been a method comprising preparing a cobalt compound containing an additional element by a coprecipitation method, and baking this cobalt compound and a lithium compound. When a cobalt compound containing Al or the like is prepared by the coprecipitation method, however, the compound has considerably a low tap density. This may result problematically in a low tap density of a positive electrode active material and a small battery capacity.

DISCLOSURE OF INVENTION

In view of what was described above, an object of the present invention is to improve both a cycle life characteristic of a non-aqueous electrolyte secondary battery and thermal stability of a positive electrode active material thereof to the best without reducing the tap density of the positive electrode active material.

The present invention relates to a positive electrode active material for a non-aqueous electrolyte secondary battery, comprising a particle of a composite oxide which contains Li and Co, wherein: the composite oxide further contains an element $M^1$ and an element $M^2$; the element $M^1$ is at least one selected from the group consisting of Mg, Cu and Zn; the element $M^2$ is at least one selected from the group consisting of Al, Ca, Ba, Sr, Y and Zr; the element $M^1$ is uniformly distributed in the particle; and the element $M^2$ is distributed in the surface portion of the particle more than in the inside thereof.

It is not necessary here that the element $M^1$ be distributed in the particle in a completely uniform manner. The distribution of the element $M^1$ inside the particle may be substantially about the same as the distribution of the element $M^1$ in the surface portion of the particle. It is required, on the other hand, that large portion of the element $M^2$ be distributed in the surface portion of the particle, from the viewpoint of preventing reduction in tap density of the active material. Specifically, the element $M^2$ is preferably distributed in the surface portion (when a particle radius is defined as "r", a region within 0.3 r from the surface) of the particle with a concentration equal to or over 1.2 times as high as the concentration in the central part (when a particle radius is defined as "r", a region within 0.3 r from the center) of the particle.

It is to be noted that a value of half the mean particle size of all the particles constituting the active material is employed as the particle radius "r". The mean particle size used here is a Feret radius measured by a counting method through observation using an electron microscope.

Further, the respective element concentrations in the region within 0.3 r from the surface of the particle and in the region within 0.3 r from the center thereof can for example be measured by the following method.

First, an active material is molded into the form of a pellet, a region from the surface to a 0.3 r depth of the pellet is sputtered, and a composition of the elements contained in that region is determined. Thereafter, the sputtering is continued and a composition of the elements contained in a region from a 0.7 r depth to a 1 r depth relative to the surface of the pellet is determined. From the compositions as thus obtained, concentrations of the prescribed elements or a concentration ratio thereof can be calculated. A composition of the elements can be determined by secondary ion mass spectrometry (SIMS), time-of-flight mass spectrometry (TOF-SIMS), X-ray photoelectron analysis (ESCA), Auger spectroscopy, X-ray microanalysis (EPMA) or the like.

It is preferable that a ratio $R^1$ of the number of moles of $M^1$ to the total number of moles of Li, Co, $M^1$ and $M^2$ which are contained in the composite oxide be not less than 0.5% and not more than 8%, and that a ratio $R^2$ of the number of moles of $M^2$ to the total number of moles be not less than 0.05% and not more than 2%.

It is preferable that the ratio $R^2$ be not more than the ratio $R^1$.

It is preferable that the particle have a mean particle size of not smaller than 1 μm and not larger than 20 μm.

It is preferable that the particle have a specific surface area of not smaller than 0.2 m²/g and not larger than 1.2 m²/g.

The present invention also relates to a method for producing a positive electrode active material for a non-aqueous electrolyte secondary battery, comprising: (1) a step A of preparing a compound X in which Co and at least one element $M^1$ selected from the group consisting of Mg, Cu and Zn are contained, and the element $M^1$ and Co are uniformly distributed; and (2) a step B of mixing a lithium compound, the compound X, and a compound Y which contains at least one element $M^2$ selected from the group consisting of Al, Ca, Ba, Sr, Y and Zr to obtain a mixture, and then heating the mixture to obtain a composite oxide containing Li, Co, $M^1$ and $M^2$.

In the aforesaid method, it is preferable that a ratio $R^1$ of the number of moles of $M^1$ to the total number of moles of Li, Co, $M^1$ and $M^2$ which are contained in the mixture be not less than 0.5% and not more than 8%, and that a ratio $R^2$ of the number of moles of $M^2$ to the total number of moles be not less than 0.05% and not more than 2%. It is also preferable that the ratio $R^2$ be not more than the ratio $R^1$.

It is preferable that the step B comprise a step of heating the mixture at a temperature of not lower than 800° C. and not higher than 1050° C.

It is also preferable that the step B comprise a step of preheating the mixture at a temperature of not lower than 600° C. and not higher than 750° C. by means of a rotary kiln, and after the preheating, heating the mixture at a temperature of not lower than 800° C. and not higher than 1050° C.

It is preferable that the lithium compound have a mean particle size of 2 to 15 μm.

It is preferable that the compound X have a mean particle size of 1 to 20 μm.

It is preferable that the compound Y have a mean particle size of 1 to 15 μm.

It is preferable that the compound X comprise tricobalt tetraoxide.

It is preferable that the step A be especially a step of coprecipitating the element $M^1$ and Co to prepare $M_1$-containing cobalt oxide as the compound X, and that the step B be a step of mixing the compound Y, the $M^1$-containing cobalt oxide and a lithium compound to obtain a mixture, and then heating the mixture to obtain a composite oxide containing Li, Co, $M^1$ and $M^2$.

When the element $M^1$ and Co are coprecipitated to obtain the $M^1$-containing cobalt oxide in the step A, the element $M^1$ and Co are uniformly distributed in the $M^1$-containing cobalt oxide. Further, when such $M^1$-containing cobalt oxide is used as the compound X to obtain a composite oxide containing Li, Co, $M^1$ and $M^2$ in the step B, in the composite oxide containing Li, Co, $M^1$ and $M^2$, the element $M^2$ is distributed more in the surface portion of the particle than in the inside thereof.

BEST MODE FOR CARRYING OUT THE INVENTION

First, a method for producing a positive electrode active material of the present invention is described.

(1) Process A

In a process A, a compound X is prepared in which Co and at least one element $M^1$ selected from the group consisting of Mg, Cu and Zn are contained, and the element $M^1$ and Co are uniformly distributed. For the compound X suitable for example are cobalt hydroxide containing $M^1$, cobalt oxide containing $M^1$, cobalt carbonate containing $M^1$ and the like. An oxide containing $M^1$ most favorably comprises tricobalt tetraoxide ($Co_3O_4$) as being stable in the air and most advantageous in cost; however, it may also comprise monocobalt monoxide (CoO), dicobalt trioxide ($Co_2O_3$) or the like.

Although there is no particular limitation on a method for preparing the compound X, a coprecipitation method is preferred, in which an alkaline aqueous solution is poured into an aqueous solution with a Co salt and an $M^1$ salt dissolved therein to precipitate a hydroxide. The next description is then given to a coprecipitation method.

In a coprecipitation method, the following raw materials can be used.

First, as a Co salt, cobalt sulfate, cobalt nitrate or the like can be used. These can be used singly or in combination. Among them, cobalt sulfate is particularly preferred.

As an $M^1$ salt used can be sulfate, nitrate, carbonate or the like. As an Mg salt used for example can be magnesium sulfate, magnesium nitrate, magnesium hydroxide, basic magnesium carbonate, magnesium chloride, magnesium fluoride, magnesium acetate, magnesium oxalate, magnesium sulfide, or the like. Further, as a Cu salt, copper sulfate, copper nitrate, copper carbonate, copper acetate, copper oxalate, copper chloride, copper sulfide or the like can be used. Moreover, as a Zn salt, zinc sulfate, zinc nitrate, zinc acetate, zinc chloride, zinc fluoride, zinc sulfide or the like can be used. These can be used singly or in combination.

In the aqueous solution where the Co salt and the $M^1$ salt are dissolved, for example, the Co salt concentration is 0.5 to 2 mol/L and the $M^1$ salt concentration is from 0.01 to 0.32 mol/L.

Further, the alkaline concentration in the alkaline aqueous solution to be poured into the aforesaid solution is from 10 to 50 wt %, for example. As an alkali to be dissolved in the alkaline aqueous solution, sodium hydroxide, potassium hydroxide, lithium hydroxide or the like can be used.

Although neither the temperature of the aqueous solution where the Co salt and the $M^1$ salt are dissolved nor the temperature of the alkaline aqueous solution is particularly limited, for example, a temperature of 20 to 60° C. can be applied.

The alkaline aqueous solution is successively added dropwise to the aqueous solution where the Co salt and the $M^1$ salt are dissolved in order that a pH of the aqueous solution is controlled to the pH which makes Co and $M^1$ coprecipitate (generally pH 8 or higher), and then a hydroxide as a coprecipitated matter of cobalt and $M^1$ is obtained. This hydroxide is filtered, washed with water, dried, and then baked in an oxygen-containing atmosphere, to obtain an oxide as the compound X.

(2) Step B

In a step B, first, a lithium compound, the compound X, and a compound Y which contains at least one element $M^2$ selected from the group consisting of Al, Ca, Ba, Sr, Y and Zr are mixed. Thereat, a ratio $R^1$ of the number of moles of $M^1$ to the total number of moles of Li, Co, $M^1$ and $M^2$ which are contained in the mixture is preferably controlled to not less than 0.5% and not more than 8%, and more preferably not less than 0.5% and not more than 5%; a ratio $R^2$ of the number of moles of $M^2$ to the total number of moles is preferably controlled to not less than 0.05% and not more than 2%, and more preferably not less than 0.05% and not more than 1%.

When the ratio $R^1$ of the number of moles of $M^1$ to the total number of moles is below 0.5%, the thermal stability of the positive electrode active material hardly improves, whereas when the ratio $R^1$ exceeds 8%, the capacity of the positive electrode active material becomes insufficient. Further, when the ratio $R^2$ of the number of moles of $M^2$ to the total number of moles is less than 0.05%, the cycle life characteristic of the battery hardly improves, whereas when the ratio $R^2$ exceeds 2%, the capacity of the positive electrode active material becomes insufficient.

It is preferable, however, that the ratio $R^2$ be not more than the ratio $R^1$. When the ratio $R^2$ exceeds the ratio $R^1$, a decrease in discharge capacity becomes greater.

For the compound Y containing the element $M^2$ suitable are a hydroxide of $M^2$, an oxide of $M^2$, a carbonate of $M^2$, a nitrate of $M^2$ and the like. As a compound containing Al, for example, aluminum hydroxide, aluminum oxide, aluminum nitrate, aluminum fluoride, aluminum sulfate or the like can be used. As a compound containing Ca, calcium hydroxide, calcium oxide or the like can be used. Further, as a compound containing Ba, barium hydroxide, barium oxide or the like can be used. As a compound containing Sr, strontium hydroxide, strontium oxide or the like can be used. As a compound containing Y, yttrium hydroxide, yttrium oxide or the like can be used. As a compound containing Zr, zirconium nitrate, zirconium hydroxide, zirconium oxide, zirconium carbonate, zirconium sulfate or the like can be used.

As the lithium compound used can be lithium carbonate, lithium hydroxide, lithium nitrate, lithium sulfate, lithium oxide or the like. Among them, lithium carbonate and lithium hydroxide are most advantageous in terms of environmental friendliness as well as cost.

The lithium compound preferably has a mean particle size of 2 to 15 μm, and more preferably 4 to 10 μm. When the mean particle size of the lithium compound is below 2 μm, the density of the obtained composite oxide containing Li, Co, $M^1$ and $M^2$ is lowered, reducing the battery capacity. When the mean particle size of the lithium compound exceeds 15 μm, on the other hand, the particles are excessively large, leading to lowering of the reactivity with the compounds X and Y, or to advancement of a non-uniform reaction.

The compound X preferably has a mean particle size of 1 to 20 μm, and more preferably 4 to 10 μm. When the mean particle size of the compound X is smaller than 1 μm, the density of the obtained composite oxide containing Li, Co, $M^1$ and $M^2$ is lowered, reducing the battery capacity. When the mean particle size of the compound X exceeds 20 μm, on the other hand, the particle size of the composite oxide containing Li, Co, $M^1$ and $M^2$ becomes excessively large, and performance-at-high-load of a battery using the composite oxide thus deteriorates.

The compound Y preferably has a mean particle size of 1 to 15 μm, and more preferably 1 to 10 μm. When the mean particle size of the compound Y is below 1 μm or over 15 μm, a uniformly mixed state of the compound Y with the compound X and the lithium compound cannot be obtained, and thereby a relatively non-uniform active material is produced.

Next, the obtained mixture is heated to produce a composite oxide containing Li, Co, $M^1$ and $M^2$.

In the step B, the mixture is preferably heated at a temperature of not lower than 800° C. and not higher than 1050° C., and more preferably not lower than 900° C. and not higher than 1050° C. When the heating temperature is lower than 800° C., the composite oxide containing Li, Co, $M^1$ and $M^2$ has such lower crystallinity that a battery using the composite oxide cannot have a sufficient discharge capacity. When the heating temperature goes beyond 1050° C., on the other hand, the composite oxide containing Li, Co, $M^1$ and $M^2$ has such a smaller specific surface area as to deteriorate the performance-at-high-load of the battery using the composite oxide.

It is further preferable that the mixture be preheated at a temperature of not lower than 600° C. and not higher than 750° C. by means of a rotary kiln before heating thereof at the temperature of not lower than 800° C. and not higher than 1050° C. Such a two-step baking method enables production of an active material with high crystallinity as well as reduction in a residue of an unreacted matter. It is to be noted that since a rotary kiln can heat a mixture, while making the mixture flow, to increase the number of contacts among the raw materials, reactivity can be improved.

According to the aforesaid method, there can be obtained a positive electrode active material, comprising a particle of a composite oxide which contains Li and Co, wherein: an element $M^1$ and an element $M^2$ are contained; $M^1$ is uniformly distributed in the particle; and $M^2$ is distributed in the surface portion of the particle more than in the inside thereof.

The positive electrode active material of the present invention preferably has a mean particle size of 1 to 20 μm, and more preferably 4 to 10 μm. When the mean particle size of the positive electrode active material is below 1 μm, the positive electrode active material has a lower density, reducing a capacity of a battery using the positive electrode active material; when the mean particle size exceeds 20 μm, the performance-at-high-load of the battery deteriorates.

Further, the positive electrode active material of the present invention preferably has a specific surface area of 0.2 to 1.2 $m^2/g$. When the specific surface area of the positive electrode active material is smaller than 0.2 $m^2/g$, performance-at-high-load of a battery using the positive electrode active material deteriorates; when the specific surface area exceeds 1.2 $m^2/g$, a contact area between the non-aqueous electrolyte and the positive electrode active material increases, and thereby an amount of gas which generates on the positive electrode increases.

The present invention is specifically described below based on examples. It should be noted that although rectangular batteries were fabricated in the following examples, the shape of the battery of the present invention is not limited thereto. The present invention is applicable to coin type, button type, sheet type, laminated type, cylindrical type, or flat type batteries, and also to large-sized batteries for use in electric automobiles and the like.

EXAMPLE 1

Positive electrode active materials respectively having the values: a ratio of the number of moles of $M^1$ to the total number of moles of Li, Co, $M^1$ and $M^2$ which were contained in a positive electrode active material defined as $R^1$; and a ratio of the number of moles of $M^2$ to the total number of moles defined as $R^2$, which are shown in Table 1, were prepared, and using these positive electrode active materials, Batteries A1 to A6 of Examples and Batteries B1 to B4 of Comparative Examples were fabricated. Herein, Mg was employed as $M^1$, and Al was employed as $M^2$.

TABLE 1

| Battery | $R^1$ | $R^2$ | Discharge capacity (mAh/g) | Capacity retention ratio (%) | Exothermic temperature (° C.) |
|---|---|---|---|---|---|
| A1 | Mg:0.2% | Al:0.5% | 139 | 68 | 220 |
| A2 | Mg:0.5% | Al:0.5% | 138 | 71 | 230 |
| A3 | Mg:2% | Al:0.5% | 137 | 80 | 250 |
| A4 | Mg:5% | Al:0.5% | 133 | 82 | 270 |
| A5 | Mg:8% | Al:0.5% | 130 | 84 | 277 |
| A6 | Mg:10% | Al:0.5% | 127 | 86 | 280 |
| B1 | Mg:0.5% | Al:0.5% | 136 | 65 | 200 |
| B2 | Mg:2% | Al:0.5% | 130 | 75 | 220 |
| B3 | Mg:5% | Al:0.5% | 120 | 77 | 250 |
| B4 | Mg:8% | Al:0.5% | 110 | 79 | 265 |

(i) Production of Positive Electrode

Positive electrode active materials to be used for Batteries A1 to A6 were prepared by introducing a below-described coprecipitating method.

Step A

A metal salt aqueous solution where cobalt sulfate and magnesium sulfate were dissolved was prepared. The concentration of cobalt sulfate in the metal salt aqueous solution was 1 mol/L, and the concentration of magnesium sulfate was adjusted according to Table 1. The metal salt aqueous solution under stirring was kept at 50° C., and an aqueous solution containing 30 wt % of sodium hydroxide was added dropwise to the metal salt aqueous solution such that the pH thereof became 12, to precipitate magnesium-containing cobalt hydroxide. The precipitated cobalt hydroxide was filtered, washed with water, dried in the air, and then baked at 400° C. for 5 hours to obtain a magnesium-containing cobalt oxide.

Step B

The obtained magnesium-containing cobalt oxide, aluminum hydroxide and lithium carbonate were mixed in a prescribed mole ratio according to Table 1. Li:(Co+Mg+Al) was 1:1 in a mole ratio. This mixture was placed into a rotary kiln and preheated in an air atmosphere at 650° C. for 10 hours. Subsequently, the mixture after preheating was raised in temperature in an electric furnace up to 950° C. in 2 hours and then baked at the temperature of 950° C. for 10 hours, to synthesize a positive electrode active material.

Positive electrode active materials to be used for Batteries B1 to B4 were prepared without introducing the coprecipitating method.

A cobalt sulfate aqueous solution with a concentration of 1 mol/L was prepared. The cobalt sulfate aqueous solution under stirring was kept at 50%, and an aqueous solution containing 30 wt % of sodium hydroxide was added dropwise to the cobalt sulfate aqueous solution such that the pH thereof became 12, to precipitate cobalt hydroxide. The precipitated matter of cobalt hydroxide was filtered, washed with water, dried in the air, and then baked at 400° C. for 5 hours to obtain cobalt oxide.

The obtained cobalt oxide, magnesium nitrate, aluminum hydroxide and lithium carbonate were mixed in a prescribed mole ratio according to Table 1. Li:(Co+Mg+Al) was 1:1 in a mole ratio. This mixture was placed into a rotary kiln and preheated in an air atmosphere at 650° C. for 10 hours. Subsequently, the mixture after preheating was raised in temperature in an electric furnace up to 950° C. in 2 hours and then baked at a temperature of 950° C. for 10 hours, to synthesize a positive electrode active material.

The respective distribution states of Al and Mg in the positive electrode active materials for use in Battery A3 and Battery B2 were investigated by means of secondary ion mass spectrometory (SIMS), time-of-flight mass spectrometry (TOF-SIMS), X-ray photoelectron analysis (ESCA), Auger spectroscopy and X-ray microanalysis (EPMA).

[Analysis of Cross Section of Positive Electrode Active Material Particle]

Each active material was mixed with an epoxy resin to be cured, and the cured matter was then cut and ground to prepare a sample for measurement. The surface of this sample was analyzed by the aforesaid analysis method to measure element distributions as well as concentration distributions in the surface portion of the particle and in the center thereof.

[Analysis from Surface into Below-the-Surface of Positive Electrode Active Material Particle]

Sputtering was employed in an analysis from the surface into below-the-surface of the particle. TOF-SIMS measurement was mainly implemented especially in the analysis of the particle surface.

It was found as a result that, in the positive electrode active material to be used for Battery A3, Al was distributed in the surface portion (when the particle radius was defined as "r", a region within 0.3 r from the surface) of the active material particle with a concentration as about twice as in the central part (when the particle radius was defined as "r", a region within 0.3 r from the center). Meanwhile, Mg was uniformly distributed in the active material particle.

It was also found that, in the positive electrode active material to be used for Battery B2, Al and Mg were distributed in the surface portion (when the particle radius was defined as "r", a region within 0.3 r from the surface) of the active material particle with concentrations as about twice and about 1.5 times, respectively, as high as in the central part (when the particle radius was defined as "r", a region within 0.3 r from the center). That is to say, both Al and Mg were distributed more in the surface portion of the active material particle.

Three parts by weight of acetylene black as a conductive agent and 7 parts by weight of polytetrafluoroethylene as a binder, and 100 parts by weight of an aqueous solution containing 1 wt % of carboxymethyl cellulose were added to 100 parts by weight of a prescribed positive electrode active material, which was stirred and mixed to obtain a paste-like positive electrode material mixture. The obtained positive electrode material mixture was applied onto each face of an aluminum foil with a thickness of 20 μm to serve as a current collector, which was dried, rolled by pressure, and cut into a prescribed size to obtain a positive electrode.

(ii) Production of Negative Electrode

Three parts by weight of styrene-butadiene rubber as a binder and 100 parts by weight of an aqueous solution containing 1 wt % of carboxymethyl cellulose were added to 100 parts by weight of flake graphite having been ground and classified so as to have a mean particle size of about 20 μm, which was stirred and mixed to obtain a paste-like negative electrode material mixture. The obtained negative electrode material mixture was applied onto each face of a copper foil with a thickness of 15 μm to serve as a current collector, which was dried, rolled by pressure, and cut into a prescribed size to obtain a negative electrode.

(iii) Assembly of Battery

Figure 1:
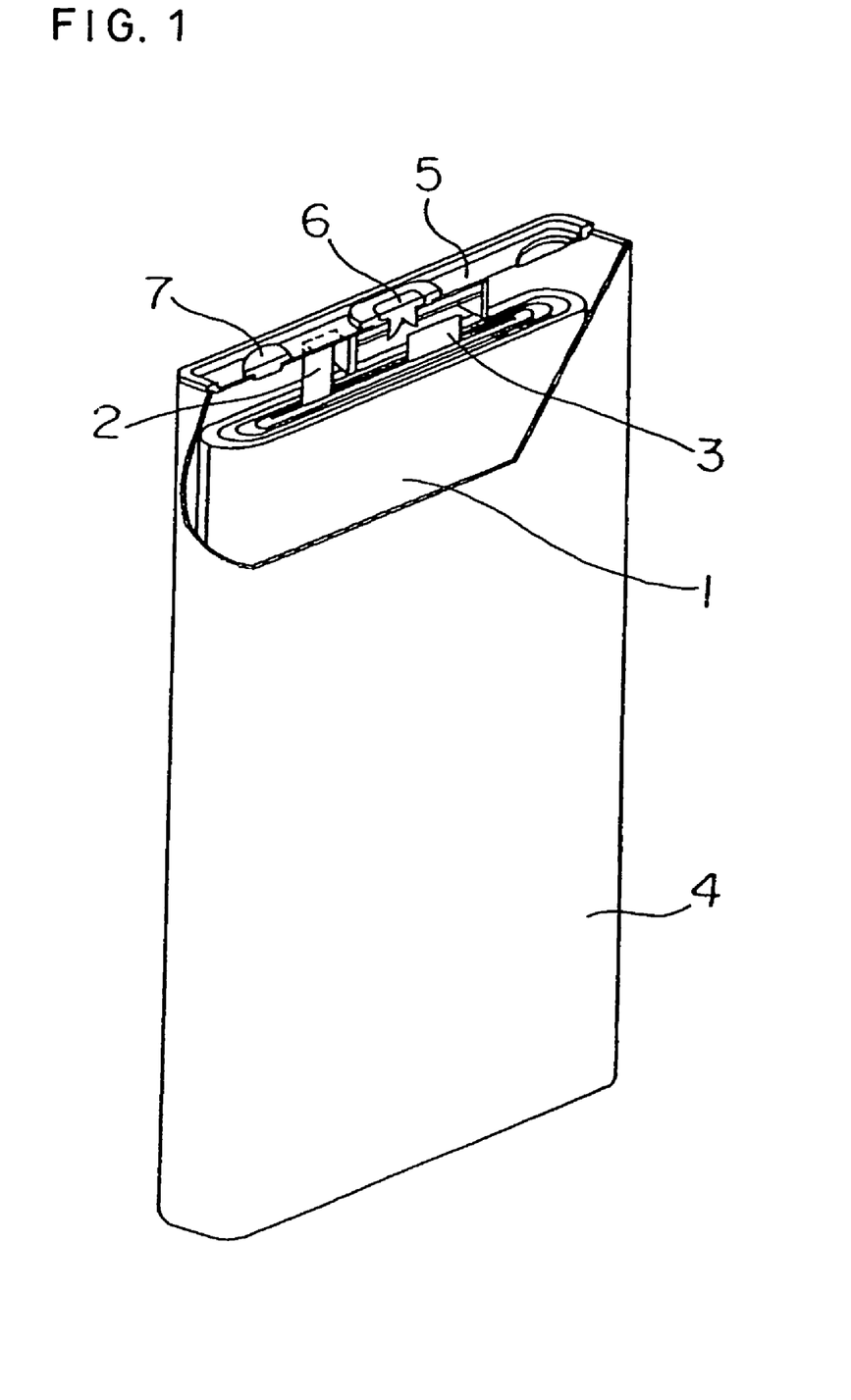
FIG. 1 is a partially cutaway oblique view of a rectangular battery of the present invention.

Using the prescribed positive electrode and the aforesaid negative electrode, a rectangular non-aqueous electrolyte secondary battery (width 34 mm, height 50 mm) was fabricated. FIG. 1 shows a partially cutaway oblique view of the rectangular battery fabricated in the present example.

The above battery was fabricated in the following manner. First, the prescribed positive electrode and the aforesaid negative electrode were would up via a micro-porous separator made of a polyethylene resin with a thickness of 25 μm, to constitute an electrode plate assembly 1. The positive electrode and the negative electrode were being welded with an aluminum-made positive electrode lead 2 and a nickel-made negative electrode lead 3, respectively. An insulating ring (not shown in the figure) made of a polyethylene resin was disposed on the upper part of the electrode plate assembly 1, which was then housed in an aluminum-made battery case 4. The other end of the positive electrode lead 2 was spot-welded to an aluminum-made sealing plate 5. Further, the other end of the negative electrode lead 3 was spot-welded to the lower part of a nickel-made negative electrode terminal 6 located midmost the sealing plate 5. After laser-welding the open end of the battery case 4 and the periphery of the sealing plate 5, a prescribed amount of a non-aqueous electrolyte was poured from an inlet arranged in the sealing plate. Finally, the inlet was sealed with an aluminum-made sealing stopper 7, and tightly sealed by laser-welding to complete a battery.

As the non-aqueous electrolyte used was one obtained by dissolving $LiPF_6$ with a concentration of 1.0 mol/L in a mixed solvent of ethylene carbonate and ethyl methyl carbonate in a volume ratio of 1:3.

(iv) Evaluation of Battery

[Discharge Capacity]

At an atmosphere temperature of 20° C., each battery was subjected to repeated charge and discharge cycles. During the charge and discharge cycles, in charging, constant-current discharge was conducted with a maximum current value of 600 mA and a charge terminal potential of 4.2 V, and after the potential reached 4.2 V, constant voltage charge was conducted for 2 hours; in discharging, constant current discharge was conducted with a current value of 600 mA and a discharge terminal potential of 3.0 V. Each discharge capacity per 1 g of the positive electrode active material at the first cycle is shown in Table 1.

Figure 2:
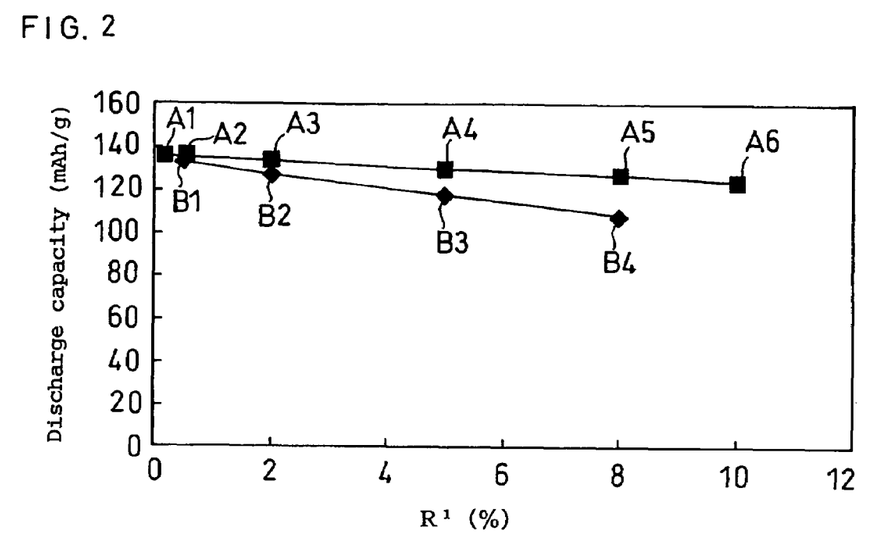
FIG. 2 is a graph representing the relationship between a ratio $R^1$ of Mg in a positive electrode active material and a discharge capacity at the first cycle, in accordance with Example 1.

Furthermore, the relationship between the ratio $R^1$ of Mg and the discharge capacity at the first cycle is shown in FIG. 2.

As shown in FIG. 2, as the ratio of Mg increases, the capacity decreases in a small amount in each of Batteries A1 to A6 whereas the capacity decreases in a large amount in each of Batteries B1 to B4. Such results are presumably attributed to that, in Batteries B1 to B4, Mg is distributed more in the surface portion of the positive electrode active material, and also that an unreacted Mg compound is apt to remain.

[Capacity Retention Ratio]

In the aforesaid charge and discharge cycles, a ratio of a discharge capacity at the 100th cycle to the discharge capacity at the first cycle was determined on percentage as a capacity retention ratio. The results are shown in Table 1.

Figure 3:
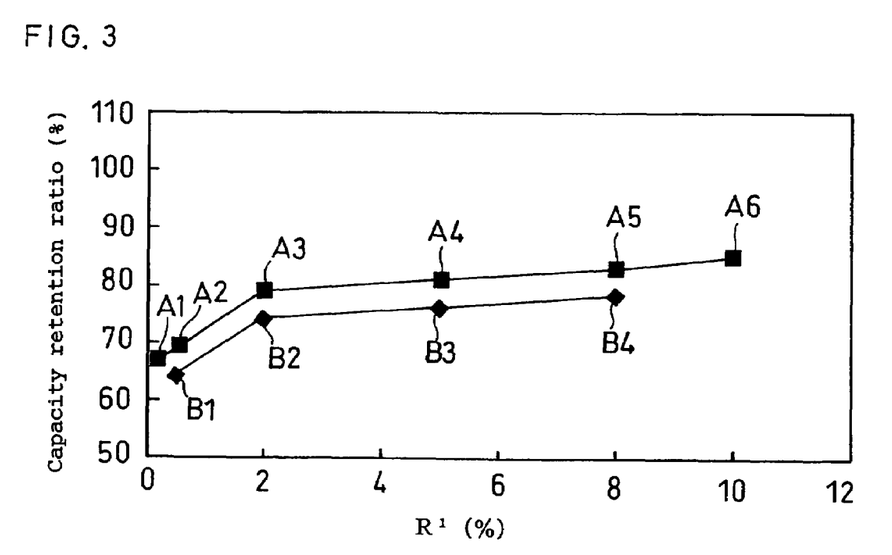
FIG. 3 is a graph representing the relationship between the ratio $R^1$ of Mg in the positive electrode active material and a capacity retention ratio at the 100th cycle, in accordance with Example 1.

Furthermore, the relationship between the ratio $R^1$ and the capacity retention ratio at the 100th cycle is shown in FIG. 3.

As indicated in FIG. 3, the respective capacity retention ratios of both Batteries A1 to A6 and Batteries B1 to B4 improve as the respective ratios of Mg contained in the positive electrode active materials increase. Such results are presumably attributed to that the crystalline structure of the positive electrode active material is stabilized due to Mg. Further, from the fact that Batteries A1 to A6 exhibit more favorable results than Batteries B1 to B4, it is revealed that since Mg is uniformly present in the positive electrode active material in each of Batteries A1 to A6, the effect of adding Mg is generated efficiently.

[Exothermic Temperature]

In the aforesaid charge and discharge cycles, after completion of three cycles of the charge and discharge, at an atmosphere temperature of 20° C., constant current charge was conducted with a maximum current value of 600 mA and a terminal voltage of 4.4V, and after the voltage reached 4.4 V, constant voltage charge was conducted for 2 hours. After the charge was completed, the battery was disassembled to take the positive electrode material mixture out of the positive electrode, and 2 mg of the taken-out material mixture was put into SUS PAN to be subjected to DSC measurement for giving information of thermal stability. The measurement was implemented using RIGAKU Thermo Plus (manufactured by Rigaku Corporation), in an air atmosphere at a temperature rising from room temperature to 400° C. at a rate of 10° C./minute. First exothermic temperatures observed in the measurement are shown in Table 1.

Figure 4:
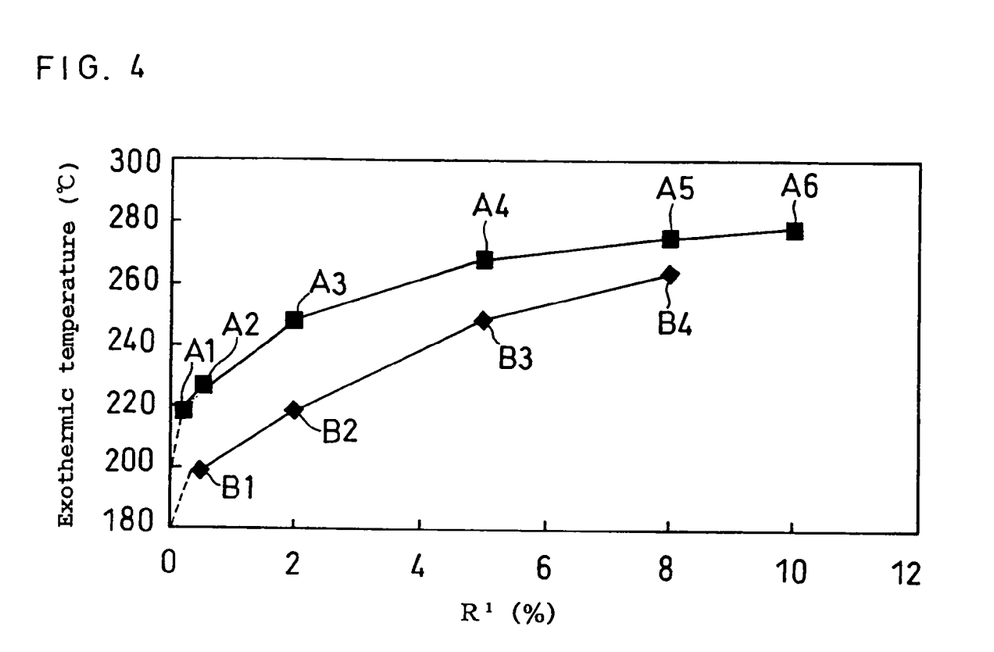
FIG. 4 is a graph representing the relationship between the ratio $R^1$ of Mg in the positive electrode active material and an exothermic temperature, in accordance with Example 1.

Furthermore, the relationship between the ratio $R^1$ and the first exothermic temperature is shown in FIG. 4.

As indicated in FIG. 4, both the thermal stabilities of Batteries A1 to A6 and those of Batteries B1 to B4 improve as the respective ratios of Mg contained in the positive electrode active materials increase. Such results are presumably attributed to that the crystalline structure of the positive electrode active material in a charged state is stabilized due to Mg. Further, from the fact that Batteries A1 to A6 exhibit more favorable results than Batteries B1 to B4, it is found that since Mg is uniformly present through the positive electrode active material in each of Batteries A1 to A6, the effect of adding Mg is efficiently generated with a small amount thereof.

EXAMPLE 2

Positive electrode active materials respectively having the values: a ratio of the number of moles of $M^1$ to the total number of moles of Li, Co, $M^1$ and $M^2$ which were contained in a positive electrode active material defined as $R^1$; and a ratio of the number of moles of $M^2$ to the total number of moles defined as $R^2$, which are shown in Table 2, were prepared, and using these positive electrode active materials, Batteries A7 to A12 of Examples and Batteries B5 to B8 of Comparative Examples were fabricated. Herein, Mg was employed as $M^1$, and Al was employed as $M^2$.

TABLE 2

| Battery | $R^1$ | $R^2$ | Discharge capacity (mAh/g) | Capacity retention ratio (%) | Exothermic temperature (° C.) | Tap density (g/cm$^3$) |
|---|---|---|---|---|---|---|
| A7 | Mg:2% | Al:0.01% | 139 | 76 | 235 | 2 |
| A8 | Mg:2% | Al:0.05% | 139 | 77 | 240 | 2 |
| A9 | Mg:2% | Al:0.1% | 138.7 | 78 | 245 | 2 |
| A10 | Mg:2% | Al:1% | 135 | 83 | 260 | 1.98 |
| A11 | Mg:2% | Al:2% | 131 | 88 | 265 | 1.97 |
| A12 | Mg:2% | Al:5% | 120 | 94 | 275 | 1.95 |
| B5 | Mg:2% | Al:0.05% | 139 | 77 | 236 | 1.8 |
| B6 | Mg:2% | Al:0.1% | 138 | 79 | 247 | 1.6 |
| B7 | Mg:2% | Al:1% | 133 | 85 | 265 | 1.5 |
| B8 | Mg:2% | Al:2% | 128 | 89 | 270 | 1.4 |

(i) Production of Positive Electrode

Positive electrode active materials to be used for Batteries A7 to A12 were synthesized in the same manner as in Example 1 except that the ratio $R^1$ of Mg was fixed to be 2% and the ratio $R^2$ of Al was varied.

Positive electrode active materials to be used for Batteries B5 to B8 were prepared by introducing a below-described coprecipitating method.

A metal salt aqueous solution where cobalt sulfate, magnesium sulfate and aluminum sulfate were dissolved was prepared. The concentration of cobalt sulfate in the metal salt aqueous solution was 1 mol/L, and the concentrations of magnesium sulfate and aluminum sulfate were adjusted according to Table 2. The metal salt aqueous solution under stirring was kept at 50%, and an aqueous solution containing 30 wt % of sodium hydroxide was added dropwise to the metal salt aqueous solution such that the pH thereof became 12, to coprecipitate magnesium/aluminum-containing cobalt hydroxide. The precipitated cobalt hydroxide was filtered, washed with water, dried in the air, and then baked at 400° C. for 5 hours to obtain magnesium/aluminum-containing cobalt oxide. Except that the obtained magnesium/aluminum-containing cobalt oxide was used and aluminum hydroxide was not used, a positive electrode active material was synthesized in the same manner as in Example 1.

The respective distribution states of Al and Mg in the positive electrode active materials for use in Battery A9 and Battery B6 were investigated by means of secondary ion mass spectrometry (SIMS), time-of-flight mass spectrometry (TOF-SIMS), X-ray photoelectron analysis (ESCA), Auger spectroscopy and X-ray microanalysis (EPMA), as in Example 1.

It was found as a result that, in the positive electrode active material to be used for Battery A9, Al was distributed in the surface portion (when the particle radius was defined as "r", a region within 0.3 r from the surface) of the active material particle with a concentration as about three times as high as in the central part (when the particle radius was defined as "r", a region within 0.3 r from the center). Meanwhile, Mg was uniformly distributed in the active material particle.

In the positive electrode active material to be used for Battery B6, both Mg and Al were uniformly distributed in the active material particle. Namely, Al was incorporated into the inside of the active material particle in the positive electrode active material for use in Battery B6 more than in Battery A9.

Using the prescribed positive electrode, a similar rectangular non-aqueous electrolyte secondary battery to that in Example 1 was fabricated and then evaluated in the same manner as in Example 1. The results are shown in Table 2.

Figure 5:
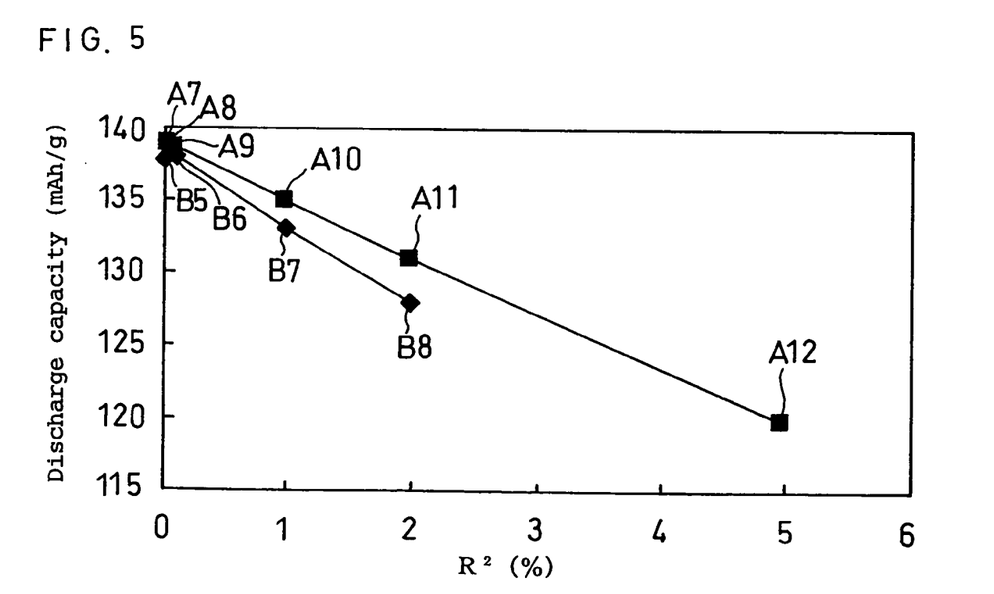
FIG. 5 is a graph representing the relationship between a ratio $R^2$ of Al in a positive electrode active material and a discharge capacity at the first cycle, in accordance with Example 2.

FIG. 5 shows the relationship between the ratio $R^2$ of Al and a discharge capacity at the first cycle.

Figure 6:
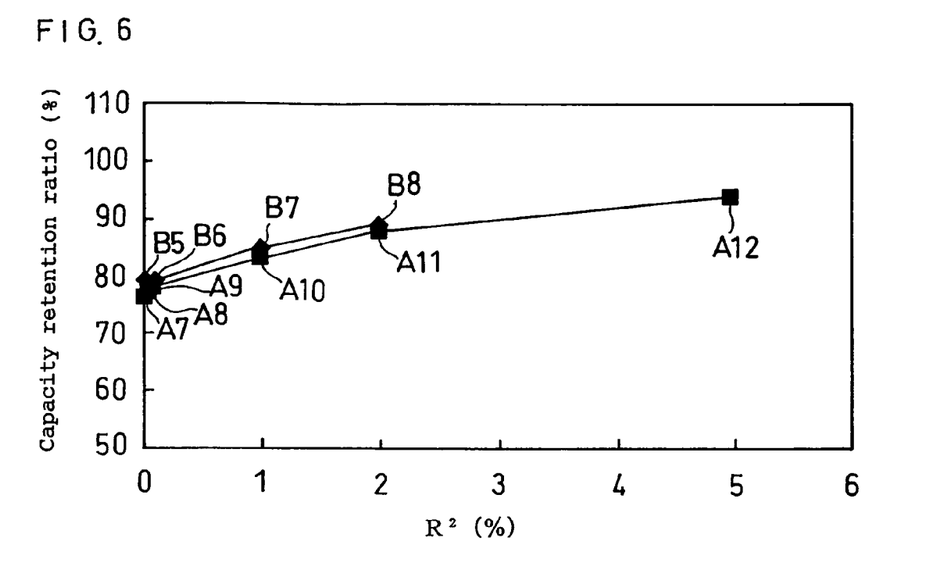
FIG. 6 is a graph representing the relationship between the ratio $R^2$ of Al in the positive electrode active material and a capacity retention ratio at the 100th cycle, in accordance with Example 2.

FIG. 6 shows the relationship between the ratio $R^2$ of Al and a capacity retention ratio at the 100th cycle.

Figure 7:
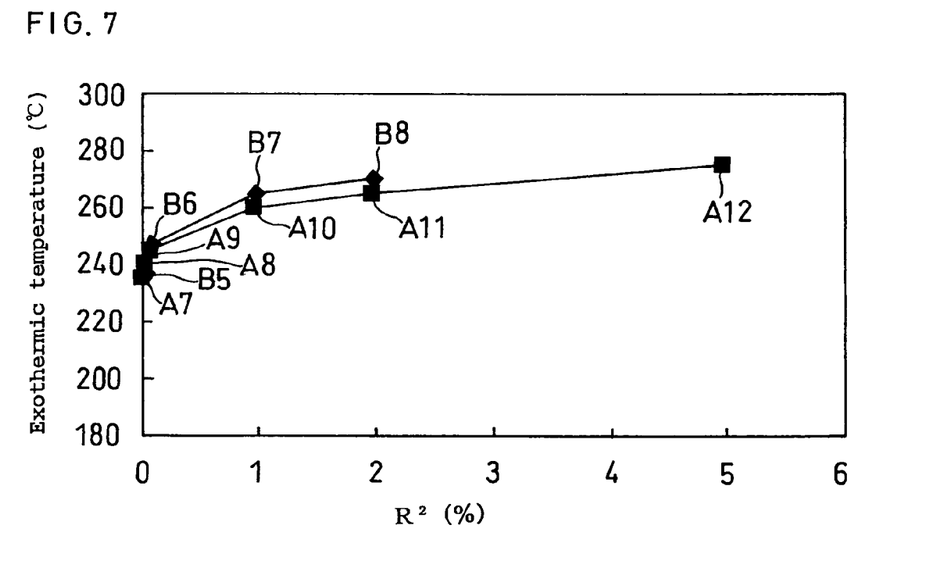
FIG. 7 is a graph representing the relationship between the ratio $R^2$ of Al in the positive electrode active material and a first exothermic temperature, in accordance with Example 2.

FIG. 7 shows the relationship between the ratio $R^2$ of Al and a first exothermic temperature.

Figure 8:
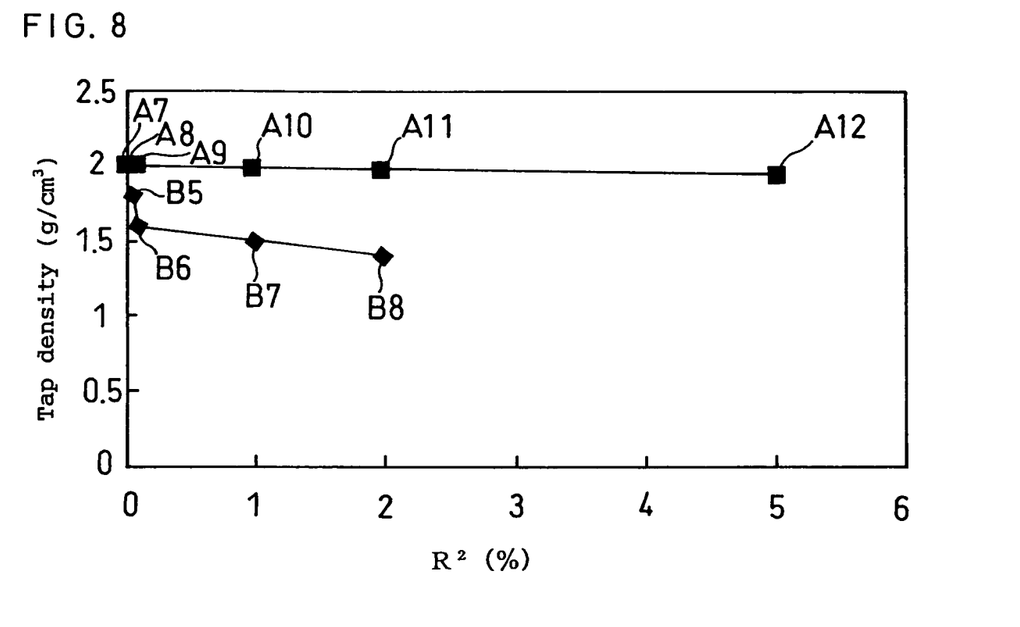
FIG. 8 is a graph representing the relationship between the ratio $R^2$ of Al in the positive electrode active material and a tap density, in accordance with Example 2.

FIG. 8 shows the relationship between the ratio $R^2$ of Al and a tap density.

As indicated in FIG. 5, it is found that the capacity of each of Batteries B5 to B8 decreases in a greater amount than that of each of Batteries A7 to A12 as the ratio of Al contained in the positive electrode active material increases. Such a result reveals that since the positive electrode active material of each of Batteries B5 to B8 was prepared by simultaneous coprecipitation of Co, Mg and Al, sulfate ion incorporated into the active material at the time of the prepartion was left in the active material after the synthesis thereof, bringing about a capacity decrease.

Further, as shown in FIGS. 6 and 7, the capacity retention ratios and the thermal stabilities of Batteries A7 to A12 and those of Batteries B5 and B8 both improve as the respective ratios of Al contained in the positive electrode active materials increase.

Moreover, as shown in FIG. 8, while there is almost no variation in tap density of each of Batteries A7 to A12 even when the ratio of Al contained in the positive electrode active material increases, there is a large decrease in tap density of each of Batteries B5 to B8 as the ratio of Al contained in the positive electrode active material increases. Such a result is presumably attributed to the fact that sulfate ion is incorporated into the positive electrode active material of each of Batteries B5 to B8 to cause the particle to expand.

EXAMPLE 3

Positive electrode active materials respectively having the values: a ratio of the number of moles of $M^1$ to the total number of moles of Li, Co, $M^1$ and $M^2$ which were contained in a positive electrode active material defined as $R^1$; a ratio of the number of moles of $M^2$ to the total number of moles defined as $R^2$, which are shown in Table 3, were prepared, and using these positive electrode active materials, Batteries A13 to A17 of Examples and Batteries B9 to B13 of Comparative Examples were fabricated. Mg was employed here as $M^1$, and Ca, Ba, Sr, Y or Zr as $M^2$.

TABLE 3

| Battery | $R^1$ | $R^2$ | Discharge capacity (mAh/g) | Capacity retention ratio (%) | Exothermic temperature (° C.) |
|---|---|---|---|---|---|
| A13 | Mg:2% | Ca:0.5% | 137 | 76 | 250 |
| A14 | Mg:2% | Ba:0.5% | 135 | 75 | 240 |
| A15 | Mg:2% | Sr:0.5% | 132 | 73 | 250 |
| A16 | Mg:2% | Y:0.5% | 133 | 73 | 230 |
| A17 | Mg:2% | Zr:0.5% | 136 | 75 | 245 |
| B9 | Mg:2% | Ca:0.5% | 128 | 72 | 225 |
| B10 | Mg:2% | Ba:0.5% | 126 | 70 | 220 |
| B11 | Mg:2% | Sr:0.5% | 125 | 71 | 228 |
| B12 | Mg:2% | Y:0.5% | 128 | 70 | 218 |
| B13 | Mg:2% | Zr:0.5% | 127 | 71 | 220 |

(i) Production of Positive Electrode

Positive electrode active materials to be used for Batteries A13 to A17 were synthesized in the same manner as for Battery Al of Example, except that the ratio $R^1$ of Mg was fixed to be 2%, and that in the step B, calcium hydroxide, barium hydroxide, strontium hydroxide, yttrium hydroxide or zirconium nitrate was used in place of aluminum hydroxide, and the ratio $R^2$ of Ca, Ba, Sr, Y or Zr was fixed to be 0.5%.

Positive electrode active materials to be used for Batteries B9 to B13 were synthesized in the same manner as for Battery B1 of Comparative Example except that the ratio $R^1$ of Mg was fixed to be 2%, calcium hydroxide, barium hydroxide, strontium hydroxide, yttrium hydroxide or zirconium nitrate was used in place of aluminum hydroxide, and the ratio $R^2$ of Ca, Ba, Sr, Y or Zr was fixed to be 0.5%.

Using the prescribed positive electrode, a similar rectangular non-aqueous electrolyte secondary battery to that in Example 1 was fabricated and then evaluated in the same manner as in Example 1. The results are shown in Table 3.

As indicated in Table 3, Batteries A13 to A17 have greater capacities, higher capacity retention ratios and more excellent thermal stabilities than Batteries B9 to B13. Such a result is presumably attributed to the fact that: in Batteries B9 to B13, Mg is distributed more in the surface portion of the positive electrode active materials and an unreacted Mg compound tends to remain; in Batteries A13 to A17, Mg is uniformly distributed in the positive electrode active material.

It is further revealed that a similar trend is observed in using any of Al, Ca, Ba, Sr, Y and Zr.

EXAMPLE 4

Positive electrode active materials respectively having the values: a ratio of the number of moles of $M^1$ to the total number of moles of Li, Co, $M^1$ and $M^2$ which were contained in a positive electrode active material defined as $R^1$; and a ratio of the number of moles of $M^2$ to the total number of moles defined as $R^2$, which are shown in Table 4, were prepared, and using these positive electrode active materials, Batteries A18 to A19 of Examples and Batteries B14 to B15 of Comparative Examples were fabricated. Cu or Zn was employed here as $M^1$, and Al as $M^2$.

TABLE 4

| Battery | $R^1$ | $R^2$ | Discharge capacity (mAh/g) | Capacity retention ratio (%) | Exothermic temperature (° C.) |
|---|---|---|---|---|---|
| A18 | Cu:2% | Al:0.5% | 132 | 75 | 230 |
| A19 | Zn:2% | Al:0.5% | 134 | 73 | 235 |
| B14 | Cu:2% | Al:0.5% | 125 | 70 | 210 |
| B15 | Zn:2% | Al:0.5% | 127 | 65 | 205 |

Positive electrode active materials to be used for Batteries A18 to A19 were synthesized in the same manner as for Battery A3 of Example, except that in the step A, copper sulfate or zinc sulfate was used in place of magnesium sulfate.

Positive electrode active materials to be used for Batteries B14 to B15 were synthesized in the same manner as for Battery B2 of Comparative Example, except that copper nitrate or zinc nitrate was used in place of magnesium nitrate.

Using the prescribed positive electrode, a similar rectangular non-aqueous electrolyte secondary battery to that in Example 1 was fabricated and then evaluated in the same manner as in Example 1. The results are shown in Table 4.

As indicated in Table 4, Batteries A18 to A19 have greater capacities, higher capacity retention ratios and more excellent thermal stabilities than Batteries B14 to B15, as in Example 1. Such a result is presumably attributed to the fact that: in Batteries B14 to B15, Cu or Zn is distributed more in the surface portion of the positive electrode active materials and an unreacted Cu or Zn compound tends to remain; in Batteries A18 to A19, Cu or Zn is uniformly distributed in the positive electrode active material.

It is further revealed that a similar trend is observed in using any of Mg, Cu and Zn.

EXAMPLE 5

Positive electrode active materials respectively having the values: a ratio of the number of moles of $M^1$ to the total number of moles of Li, Co, $M^1$ and $M^2$ which were contained in a positive electrode active material defined as $R^1$; and a ratio of the number of moles of $M^2$ to the total number of moles defined as $R^2$, which are shown in Table 5, were prepared, and using these positive electrode active materials, Batteries A20 to A21 of Examples and Batteries B16 to B17 of Comparative Examples were fabricated. Mg and Al were employed here as $M^1$ and $M^2$, respectively.

TABLE 5

| Battery | $R^1$ | $R^2$ | Discharge capacity (mAh/g) | Capacity retention ratio (%) | Exothermic temperature (° C.) |
|---|---|---|---|---|---|
| A20 | Mg:2% | Al:0.5% | 137 | 79 | 248 |
| A21 | Mg:2% | Al:0.5% | 136 | 75 | 245 |
| B16 | Mg:2% | Al:0.5% | 130 | 73 | 219 |
| B17 | Mg:2% | Al:0.5% | 129 | 71 | 220 |

Positive electrode active material to be used for Battery A20 was synthesized in the same manner as for Battery A3 of Example, except that in the step A, Mg-containing cobalt hydroxide obtained by the coprecipitating method was used as it was in place of Mg-containing cobalt oxide.

Further, positive electrode active material to be used for Battery A21 was synthesized in the same manner as for Battery A3 of Example, except that cobalt carbonate in which Mg was uniformly dissolved was used in place of Mg-containing cobalt oxide.

Positive electrode active material to be used for Battery B16 was synthesized in the same manner as for Battery B2 of Comparative Example, except that cobalt hydroxide was used in place of cobalt oxide.

Positive electrode active material to be used for Battery B17 was synthesized in the same manner as for Battery B2 of Comparative Example, except that cobalt carbonate was used in place of cobalt oxide.

Using the prescribed positive electrode, a similar rectangular non-aqueous electrolyte secondary battery to that in Example 1 was fabricated and then evaluated in the same manner as in Example 1. The results are shown in Table 5.

As indicated in Table 5, Batteries A20 to A21 have greater capacities, higher capacity retention ratios and more excellent thermal stabilities than Batteries B16 to B17, as in Example 1. Such a result is presumably attributed to the fact that: in Batteries B16 to B17, Mg is distributed more in the surface portion of the positive electrode active materials, and an unreacted Mg compound tends to remain; in Batteries A20 to A21, Mg is uniformly distributed in the positive electrode active material.

It is further revealed that a similar trend to Example 1 is observed in using Mg-containing cobalt carbonate or Mg-containing cobalt hydroxide in place of Mg-containing cobalt oxide.

INDUSTRIAL APPLICABILITY

As thus described, according to the present invention, it is possible to improve both a cycle life characteristic of a non-aqueous electrolyte secondary battery and thermal stability of a positive electrode active material thereof, to the best, without reducing the tap density of the positive electrode active material.

The invention claimed is:

1. A positive electrode active material for a non-aqueous electrolyte secondary battery, comprising a particle of a composite oxide which contains Li and Co, wherein:
   said composite oxide further contains an element $M^1$ and an element $M^2$;
   said element $M^1$ is at least one selected from the group consisting of Mg, Cu and Zn;
   said element $M^2$ is at least one selected from the group consisting of Al, Ca, Ba, Sr, Y and Zr;
   said element $M^1$ is uniformly distributed in said particle; and
   said element $M^2$ is distributed in the surface portion of said particle more than in the inside thereof,
   wherein a ratio $R^1$ of the number of moles of $M^1$ to the total number of moles of Li, Co, $M^1$ and $M^2$ which are contained in said composite oxide is not less than 0.5% and not more than 8%, and a ratio $R^2$ of the number of moles of $M^2$ to said total number of moles is not less than 0.05% and not more than 2%.

2. The positive electrode active material for a non-aqueous electrolyte secondary battery in accordance with claim 1, wherein said ratio $R^2$ is not more than said ratio $R^1$.

3. The positive electrode active material for a non-aqueous electrolyte secondary battery in accordance with claim 1, wherein said particle has a mean particle size of not smaller than 1 μm and not larger than 20 μm, and a specific surface area of not smaller than 0.2 $m^2/g$ and not larger than 1.2 $m^2/g$.

4. The positive electrode active material for a non-aqueous electrolyte secondary battery in accordance with claim 1, wherein said element $M^1$ is Zn.

5. A method for producing a positive electrode active material for a non-aqueous electrolyte secondary battery, comprising:

(1) a step A of preparing a compound X in which Co and at least one element $M^1$ selected from the group consisting of Mg, Cu and Zn are contained, and said element $M^1$ and Co are uniformly distributed; and (2) a step B of mixing a lithium compound, said compound X, and a compound Y which contains at least one element $M^2$ selected from the group consisting of Al, Ca, Ba, Sr, Y and Zr to obtain a mixture, and then heating said mixture to obtain a composite oxide containing Li, Co, $M^1$ and $M^2$.

6. The method for producing a positive electrode active material for a non-aqueous electrolyte secondary battery in accordance with claim 5, wherein a ratio $R^1$ of the number of moles of $M^1$ to the total number of moles of Li, Co, $M^1$ and $M^2$ which are contained in said mixture is not less than 0.5% and not more than 8%, and a ratio $R^2$ of the number of moles of $M^2$ to said total number of moles is not less than 0.05% and not more than 2%.

7. The method for producing a positive electrode active material for a non-aqueous electrolyte secondary battery in accordance with claim 6, wherein said ratio $R^2$ is not more than said ratio $R^1$.

8. The method for producing a positive electrode active material for a non-aqueous electrolyte secondary battery in accordance with claim 5, wherein said step B comprises a step of heating said mixture at a temperature of not lower than 800° C. and not higher than 1050° C.

9. The method for producing a positive electrode active material for a non-aqueous electrolyte secondary battery in accordance with claim 5, wherein said step B comprises a step of preheating said mixture at a temperature of not lower than 600° C. and not higher than 750° C. by means of a rotary kiln, and after said preheating, heating said mixture at a temperature of not lower than 800° C. and not higher than 1050° C.

* * * * *